US012634535B2

(12) United States Patent
Ono et al.

(10) Patent No.: US 12,634,535 B2
(45) Date of Patent: May 19, 2026

(54) VIDEO DISPLAY DELAY TIME MEASUREMENT SERVER, DELAY TIME MEASUREMENT METHOD AND PROGRAM

(71) Applicant: NTT, Inc.

(72) Inventors: Hiroya Ono, Musashino (JP); Tatsuya Fukui, Musashino (JP); Toshihito Fujiwara, Musashino (JP); Ryota Shiina, Musashino (JP)

(73) Assignee: NTT, Inc., Tokyo (JP)

( * ) Notice: Subject to any disclaimer, the term of this patent is extended or adjusted under 35 U.S.C. 154(b) by 21 days.

(21) Appl. No.: 18/727,399

(22) PCT Filed: Jan. 12, 2022

(86) PCT No.: PCT/JP2022/000630
§ 371 (c)(1),
(2) Date: Jul. 9, 2024

(87) PCT Pub. No.: WO2023/135665
PCT Pub. Date: Jul. 20, 2023

(65) Prior Publication Data
US 2025/0097493 A1 Mar. 20, 2025

(51) Int. Cl.
*G06F 15/16* (2006.01)
*H04N 21/24* (2011.01)

(52) U.S. Cl.
CPC ............................... *H04N 21/2408* (2013.01)

(58) Field of Classification Search
CPC ........................... H04N 21/2408; H04N 21/24
See application file for complete search history.

(56) References Cited

U.S. PATENT DOCUMENTS 8,607,286 B2 * 12/2013 Yang ................... H04L 47/2416
725/120
8,706,802 B1 * 4/2014 Dayan ................. G06F 16/9577
345/632
(Continued)

FOREIGN PATENT DOCUMENTS

| JP | 2008125721 | 6/2008 |
| JP | 2014127905 | 7/2014 |
| JP | 2021509838 | 4/2021 |

OTHER PUBLICATIONS

H-path.co.jp [online], "2. How to measure delay time," available on or before Sep. 2020, retrieved on Nov. 2021, retrieved from URL<https://h-path.co.jp/technologies/2-how-to-measure-latency/>, 13 pages (with machine translation).
(Continued)

*Primary Examiner* — Razu A Miah
(74) *Attorney, Agent, or Firm* — Fish & Richardson P.C.

(57) ABSTRACT

A delay time measurement server calculates a video display delay time representing the latency from video transmission to display on a client monitor. The server encodes a specific video, such as a countdown or moving symbol, and transmits it to the monitor. A user provides an input upon observing the specific video, which generates a signal. The server measures the elapsed time between transmitting the video and receiving the generated signal. The server determines the video display delay time based on this elapsed time, accounting for the user's reaction time and network command latency.

6 Claims, 8 Drawing Sheets

(56) References Cited

U.S. PATENT DOCUMENTS

| | | | |
|---|---|---|---|
| 2005/0208979 A1* | 9/2005 | Kim ........................ | H04N 7/148 |
| | | | 455/418 |
| 2008/0187282 A1* | 8/2008 | Brady .................... | H04L 65/80 |
| | | | 386/E5.07 |
| 2012/0311173 A1* | 12/2012 | Agarwal ........... | H04W 36/0079 |
| | | | 709/231 |
| 2013/0106820 A1* | 5/2013 | Seo ...................... | H04N 13/341 |
| | | | 345/204 |
| 2015/0326901 A1* | 11/2015 | Tiraspolsky ......... | H04N 21/262 |
| | | | 725/31 |
| 2019/0090028 A1* | 3/2019 | Kirley ............. | H04N 21/41265 |
| 2019/0321725 A1 | 10/2019 | Zimring et al. | |
| 2020/0245004 A1* | 7/2020 | Karapantelakis .. | H04N 21/2408 |
| 2020/0404136 A1* | 12/2020 | Fuchikami ............ | H04N 23/63 |
| 2021/0234626 A1* | 7/2021 | Koshiji ................ | H04J 3/0682 |
| 2021/0329049 A1* | 10/2021 | Sehgal ................. | G06F 3/0484 |

OTHER PUBLICATIONS

Morimoto et al., "Temporal Processing Instability with Millisecond Accuracy is a Cardinal Feature of Sensorimotor Impairments in Autism Spectrum Disorder: Analysis Using the Synchronized Finger-TappingTask," J. Autism. Dev. Disord., Feb. 2018, 48(2):351-360.

* cited by examiner

Fig. 2

LED DRIVE SIGNAL

LUMINANCE OF LED IMAGE ON MONITOR

60 DELAY TIME MEASUREMENT SERVER

53 COMMUNICATION NETWORK

TIME SYNCHRONIZATION

71 COMPUTER

72 MONITOR

VIDEO DISPLAY DELAY TIME MEASUREMENT SERVER, DELAY TIME MEASUREMENT METHOD AND PROGRAM

CROSS-REFERENCE TO RELATED APPLICATIONS

This application is a National Stage application under 35 U.S.C. § 371 of International Application No. PCT/JP2022/000630, having an International Filing Date of Jan. 12, 2022, the disclosure of which is considered part of the disclosure of this application, and is incorporated by reference in its entirety into this application.

TECHNICAL FIELD

The present disclosure relates to a technique for calculating a video display delay time until a video from a server is displayed on a monitor on the client side.

BACKGROUND ART

In recent years, with the spread of remote work, online games, and cloud games, the importance of communication using a video has increased. In such communication using a video, the delay of the video is an important parameter that determines a perceived quality. In order to smoothly advance communication using a video in remote work, it is important to shorten the delay of the video between remote bases. In order to ensure the fairness in a game using a video in an online game or cloud game, it is important to shorten a difference in video display delay times from when a cloud game server transmits the video until when the video is displayed on monitors on the client side.

The delay of a video includes not only communication delay generated in a communication network but also delay generated in processing of a video signal and in a monitor. A technique for quantitatively measuring or estimating these video display delay times is required.

As a method for measuring these video display delay times, there is a measurement method using an LED and an optical sensor (see, for example, Non Patent Literature 1). FIG. 1 illustrates a conventional video delay time measurement system using an LED and an optical sensor. In FIG. 1, the reference numeral 51 denotes an LED, the reference numeral 52 denotes a video camera, the reference numeral 53 denotes a communication network, and the reference numeral 54 denotes a monitor. The LED 51 is imaged by the video camera 52, and an LED image is displayed on the monitor 54 via the communication network 53.

FIG. 2 illustrates a conventional technique for measuring a delay time of a video. FIG. 2 illustrates a time series of measurement using the LED and the optical sensor. In FIG. 2, a signal for turning on the LED 51 is represented as an LED drive signal, and display on the monitor is represented as luminance of the LED image on the monitor 54. The time from when the LED 51 is turned on until when the LED displayed on the monitor 54 starts to be turned on is observed as a time difference T1 between the leading edge of the LED drive signal and the rising point of the luminance of the LED image on the monitor 54. The time difference T1 can be evaluated as a video display delay time.

However, in order to observe the time difference T1, the LED 51 and the monitor 54 need to be installed at the same place. In a case where a video generation source is installed in a center and a monitor is installed on the client side away from the center as in a cloud game, time synchronization control is required for these devices.

FIG. 3 illustrates a related video delay time measurement system that performs time synchronization control. In FIG. 3, the reference numeral 60 denotes a delay time measurement server, the reference numeral 53 denotes a communication network, the reference numeral 71 denotes a computer, and the reference numeral 72 denotes a monitor. A video is transmitted from the delay time measurement server 60, and the time at which the video is transmitted is stored. The computer 71 receives the video transmitted via the communication network 53. The computer 71 sends the received video to the monitor 72. The computer 71 transmits the time at which the video is received to the delay time measurement server 60 via the communication network 53. The delay time measurement server 60 calculates a video display delay time from the difference between the time at which the video is transmitted and the time at which the computer receives the video.

CITATION LIST

Non Patent Literature

Non Patent Literature 1: https://h-path.co.jp/technologies/2-how-to-measure-latency/

Non Patent Literature 2: Morimoto, C., Hida, E., Shima, K. et al. Temporal Processing Instability with Millisecond Accuracy is a Cardinal Feature of Sensorimotor Impairments in Autism Spectrum Disorder: Analysis Using the synchronized Finger-Tapping Task. J Autism Dev Disord 48, 351-360 (2018). https://doi.org/10.1007/s10803-017-3334-7

SUMMARY OF INVENTION

Technical Problem

However, in the delay time measurement system illustrated in FIG. 3, a time synchronization device is required to perform time synchronization between the computer 71 installed on the client side and the delay time measurement server 60. In order to add the time synchronization device to the computer 71 or the like installed on the client side, device cost increases.

Therefore, in order to solve the above-described problem, an object of the present disclosure is to provide a delay time measurement server, a delay time measurement method, and a program for calculating a video display delay time without arranging a special device on the client side.

Solution to Problem

In order to solve the above problem, in a video display delay time calculation technique of the present disclosure, the time from when a delay time measurement server transmits a specific video until when the delay time measurement server receives a reaction signal for the specific video is calculated as a video display delay time.

Specifically, a delay time measurement server of the present disclosure calculates a video transmission delay time from when a video signal obtained by encoding a specific video is transmitted toward a monitor until when a reaction signal for the specific video is received, as a video display delay time from when the video signal is transmitted toward the monitor until when the video is displayed on the monitor.

3

Specifically, the delay time measurement server of the present disclosure includes:

a video synthesis unit that encodes the specific video and generates the video signal;

a video distribution unit that distributes the video signal generated by the video synthesis unit and makes a notification of a timing at which the video signal corresponding to the specific video is distributed as a transmission timing;

a transmission interface that transmits the video signal distributed by the video distribution unit toward the monitor via a communication network;

a reception interface that receives the reaction signal via the communication network;

an operation signal reception unit that makes a notification of a timing at which the reaction signal is received as a reception timing when the reception interface receives the reaction signal;

a time holding unit that holds a time at which the video distribution unit makes the notification of the transmission timing as a transmission time and holds a time at which the operation signal reception unit makes the notification of the reception timing as a reception time; and a delay estimation unit that calculates, as the video display delay time, the video transmission delay time, which is a difference between the transmission time and the reception time held by the time holding unit.

Specifically, in the delay time measurement server, the specific video is a video corresponding to count zero in a countdown moving image.

Specifically, in the delay time measurement server, the specific video is a video in which a symbol has moved to a predetermined position in a moving image in which the symbol moves.

Specifically, in the delay time measurement server, the specific video is a video when an object comes to a predetermined position in a moving image in which the object moves at a constant speed.

Specifically, a delay time measurement method of the present disclosure includes calculating a video transmission delay time from when a video signal obtained by encoding a specific video is transmitted toward a monitor until when a reaction signal for the specific video is received, as a video display delay time from when the video signal is transmitted toward the monitor until when the video is displayed on the monitor.

Specifically, the present disclosure includes:

a program for causing a computer to function as the delay time measurement server according to any one of the above.

Note that the inventions disclosed above can be combined to the extent possible.

Advantageous Effects of Invention

According to the present disclosure, it is possible to calculate a video display delay time without arranging a special device on the client side.

4

Figure 2:
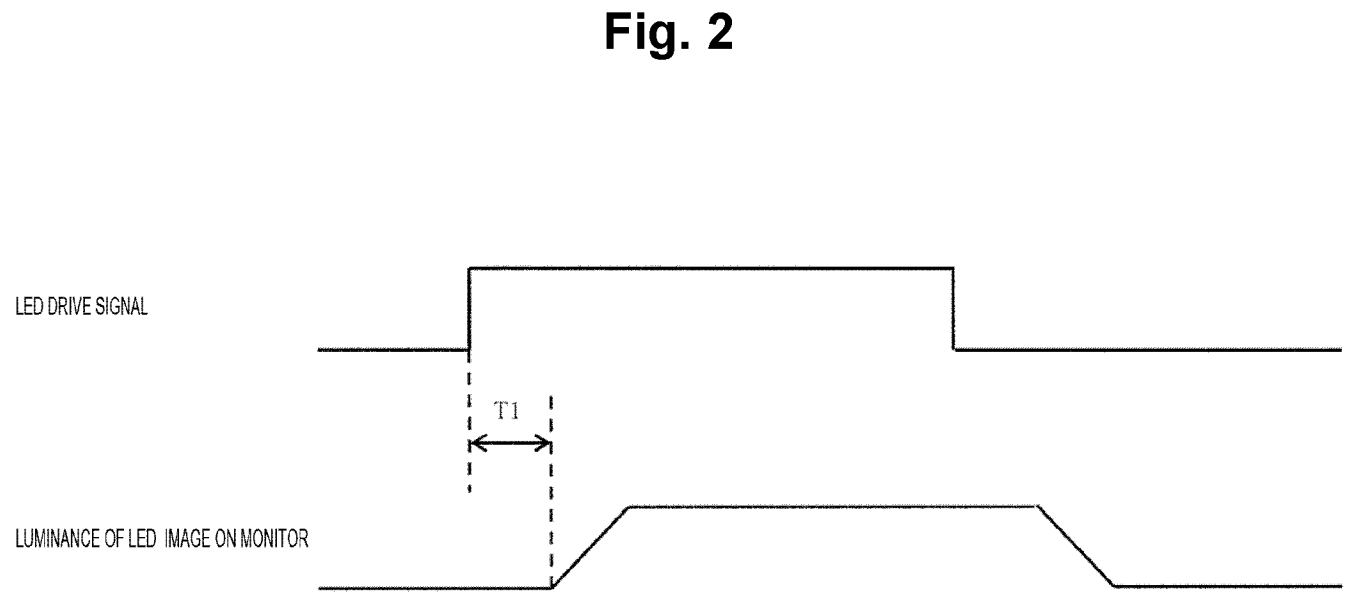

FIG. 2 is a diagram for describing a conventional technique for measuring a delay time of a video.

Figure 3:
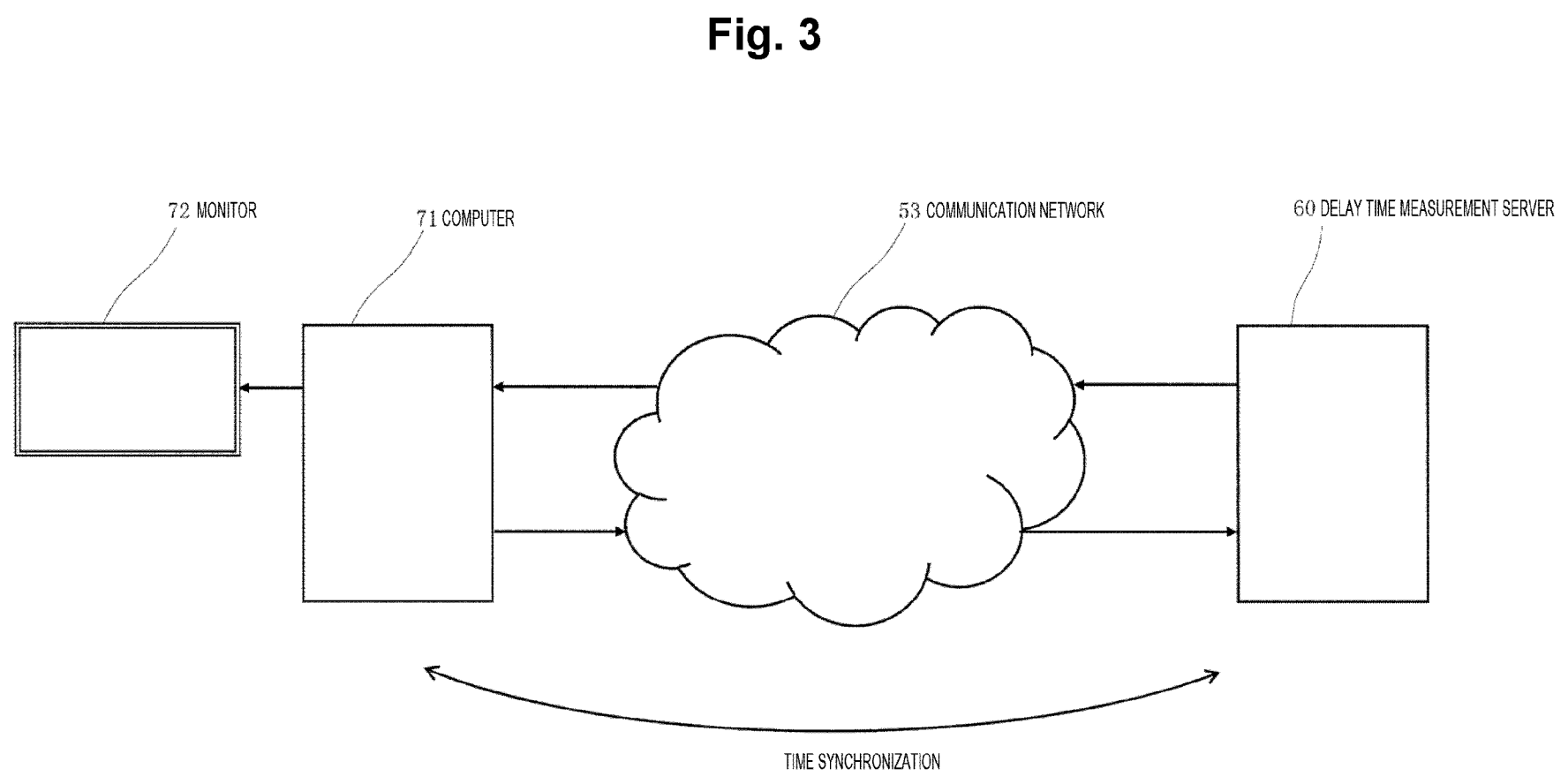

FIG. 3 is a diagram for describing a related video delay time measurement system.

Figure 1:
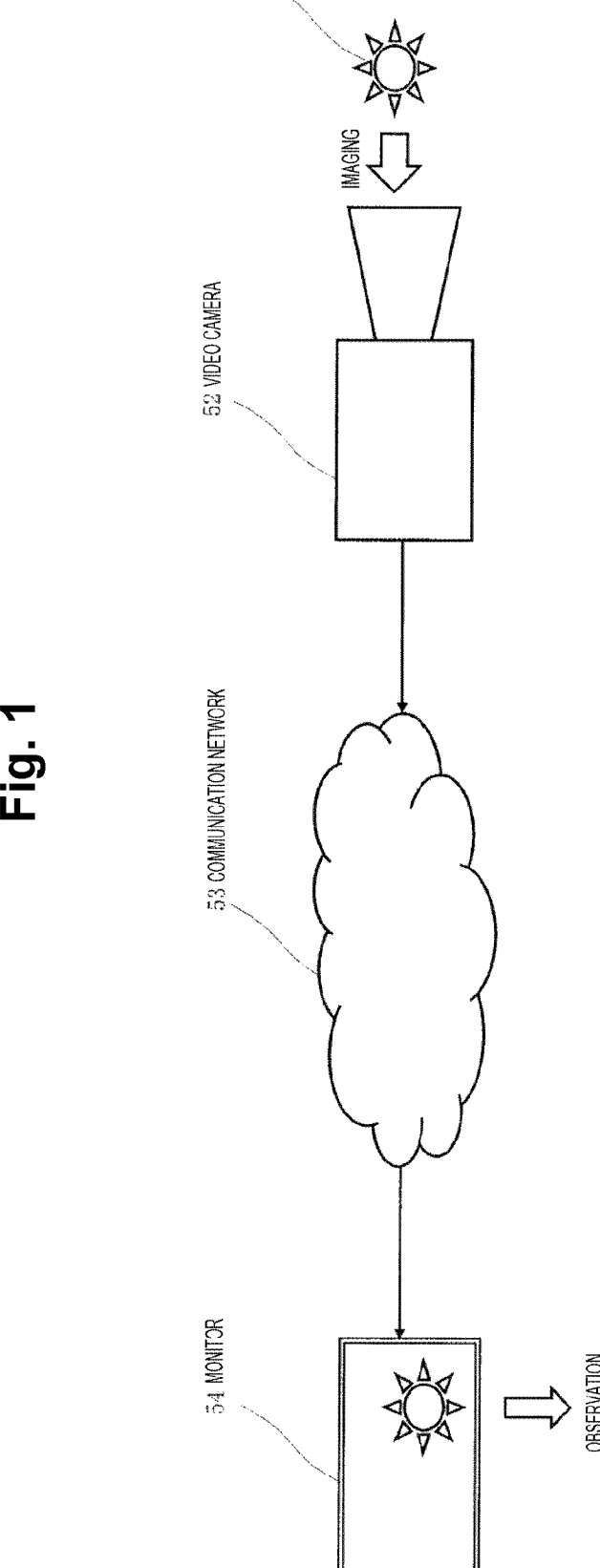
FIG. 1 is a diagram for describing a conventional video delay time measurement system.
Figure 4:
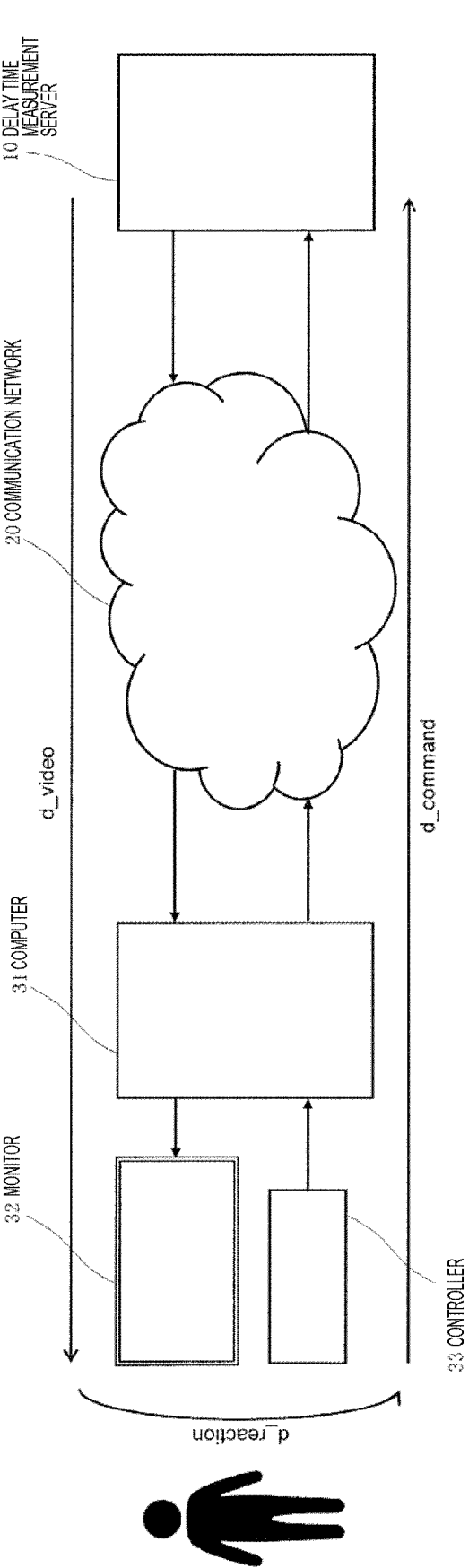

FIG. 4 is a diagram for describing a video delay time measurement system of the present disclosure.

Figure 5:
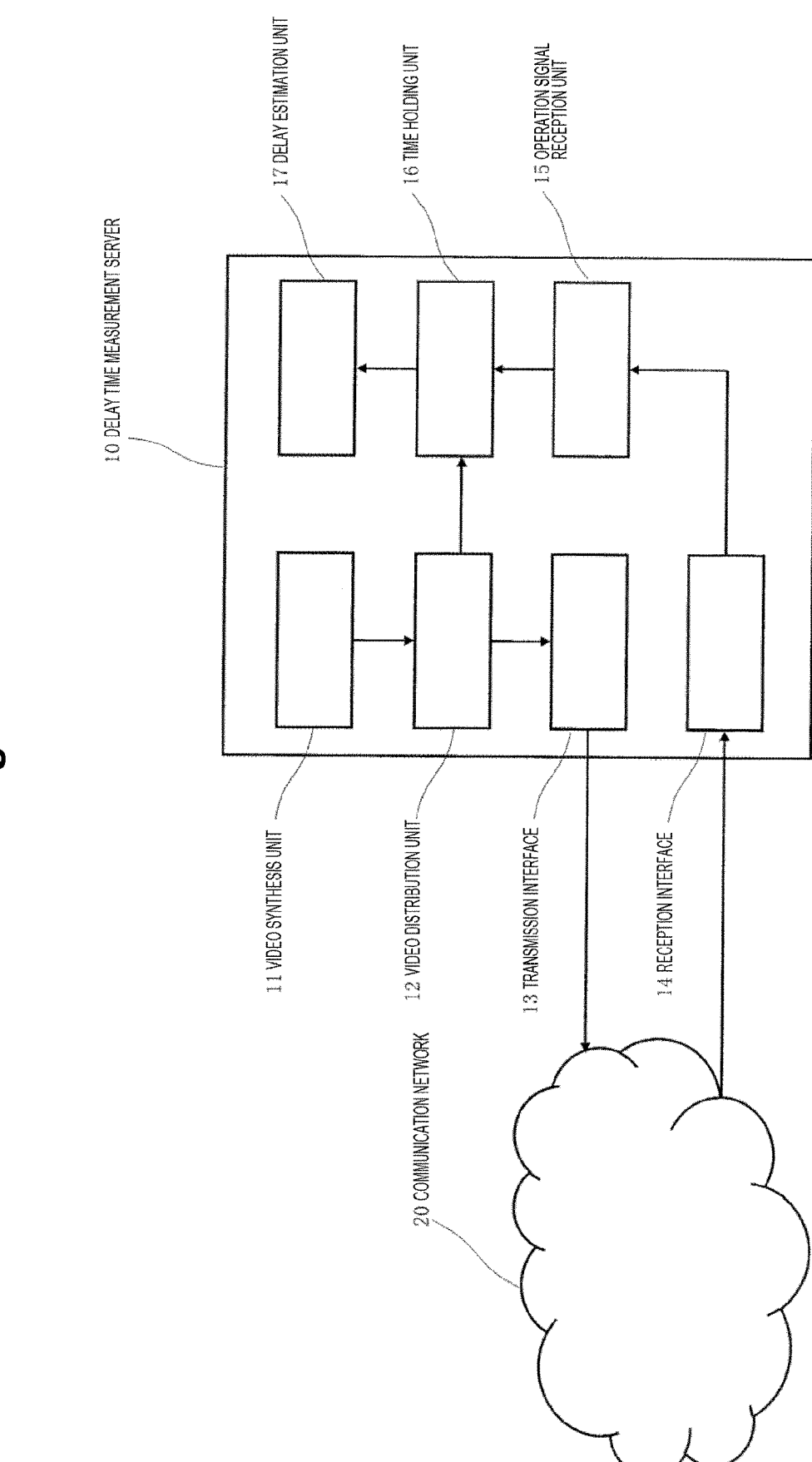

FIG. 5 is a diagram for describing a configuration of a video delay time measurement server of the present disclosure.

Figure 6:
Figure 6:
Figure 6:
Figure 6:
Figure 6:

FIG. 6 is a diagram for describing a video used for calculating a video display delay time in the present disclosure.

Figure 7:
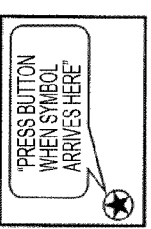
Figure 7:
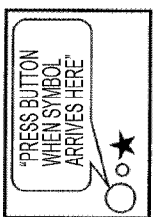
Figure 7:
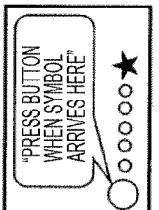
Figure 7:
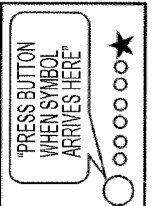
Figure 7:
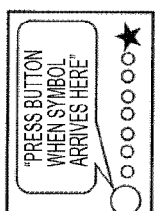

FIG. 7 is a diagram for describing a video used for calculating a video display delay time in the present disclosure.

Figure 8:
Figure 8:
Figure 8:
Figure 8:
Figure 8:
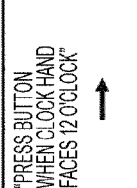

FIG. 8 is a diagram for describing a video used for calculating a video display delay time in the present disclosure.

DESCRIPTION OF EMBODIMENTS

Hereinafter, embodiments of the present disclosure will be described in detail with reference to the drawings. Note that the present disclosure is not limited to the following embodiments. These embodiments are merely examples, and the present disclosure can be implemented in a form with various modifications and improvements based on the knowledge of those skilled in the art. Note that components having the same reference numerals in the present specification and the drawings indicate the same components.

Embodiment 1

FIG. 4 illustrates a configuration of a video delay time measurement system of the present disclosure. In FIG. 4, the reference numeral 10 denotes a delay time measurement server, the reference numeral 20 denotes a communication network, the reference numeral 31 denotes a computer, the reference numeral 32 denotes a monitor, and the reference numeral 33 denotes a controller. The video delay time measurement server 10 of the present disclosure calculates a video transmission delay time from when a video signal obtained by encoding a specific video is transmitted toward the monitor 32 until when a reaction signal for the specific video is received, as a video display delay time from when the video signal is transmitted toward the monitor 32 until when the video is displayed on the monitor 32.

In the video delay time measurement system of the present disclosure, the delay time measurement server 10 generates a video signal obtained by encoding a specific video, and transmits the generated video signal toward the monitor 32 via the communication network 20. The delay time measurement server 10 stores a transmission time t_start of the video signal. The computer 31 receives the video signal from the communication network 20 and outputs the video signal to the monitor 32. The monitor 32 displays the specific video. The delay time from when the delay time measurement server 10 transmits the video signal until when the monitor 32 displays the specific video is defined as a video display delay time d_video.

A user on the client side observes the specific video displayed on the monitor 32, and operates a button of the controller 33 in response to the specific video. The delay time from when the monitor 32 displays the specific video until when the user on the client side operates the button of the controller 33 is defined as a reaction delay time d_reaction.

When the button is operated, the controller 33 outputs a reaction signal to the computer 31. The computer 31 transmits the reaction signal to the delay time measurement server 10 via the communication network 20. The controller 33 may transmit the reaction signal to the delay time measurement server 10 via the communication network 20 without passing through the computer 31. The delay time measurement server 10 receives the reaction signal via the communication network 20. The delay time measurement server 10 stores a reception time t_fin of the reaction signal. The delay time from when the controller 33 detects the button operation until when the delay time measurement server 10 receives the reaction signal is defined as a command delay time d_command.

Here, a long frame length is used for transmission of the video signal, and thus it takes a long time to perform digital processing for data transfer and reception processing. In a video signal, a video is often highly compressed, and in this case, it takes a long time to perform compression processing on the video signal at the time of transmission and to decode the video from the received signal. It takes a long time to perform display processing for displaying a video signal, which is a digital signal, on a monitor. For these reasons, the video display delay time d_video is prolonged. For example, the video display delay time d_video is usually about 100 milliseconds.

The reaction delay time d_reaction depends on the accuracy of timing matching by a human. According to Non Patent Literature 2, a human can match a timing with an error of about 53 milliseconds in response to a periodic stimulus. When n samples are collected as statistics, the accuracy can be about 53 milliseconds/$n^{1/2}$. If 10 samples are collected, the reaction delay time d_reaction is about 17 milliseconds. Therefore, it can be said that the reaction delay time d_reaction is smaller than the video display delay time d_video.

A transmission delay occupies most of the command delay time d_command. When measured with Ping, the command delay time d_command is usually about 10 milliseconds. Therefore, it can be said that the command delay time d_command is smaller than the video display delay time d_video.

Since the sum of the reaction delay time d_reaction and the command delay time d_command is smaller than the video display delay time d_video, a video transmission delay time (t_fin−t_start) is expressed by Formula (1).

$$t\_fin-t\_start = d\_video \qquad (1)$$
$$+(d\_reaction + d\_command)$$
$$\approx d\_video$$

That is, from Formula (1), the delay time measurement server 10 can calculate the video transmission delay time (t_fin−t_start) from when the video signal obtained by encoding the specific video is transmitted toward the monitor 32 until when the reaction signal for the specific video is received, as the video display delay time d_video from when the video signal is transmitted toward the monitor 32 until when the video is displayed on the monitor 32, as in Formula (2).

$$d\_video = t\_fin-t\_start \qquad (2)$$

Here, since the command delay time d_command is substantially a fixed value t0, Formula (3) may be used to more accurately obtain the video display delay time d_video.

$$d\_video = t\_fin - t\_start-t0 \qquad (3)$$

According to the present embodiment, it is possible to calculate the video display delay time without arranging a special device on the client side.

Embodiment 2

FIG. 5 illustrates a configuration of the video delay time measurement server 10 of the present disclosure. In FIG. 5, the reference numeral 11 denotes a video synthesis unit, the reference numeral 12 denotes a video distribution unit, the reference numeral 13 denotes a transmission interface, the reference numeral 14 denotes a reception interface, the reference numeral 15 denotes an operation signal reception unit, the reference numeral 16 denotes a time holding unit, and the reference numeral 17 denotes a delay estimation unit.

The video synthesis unit 11 encodes a specific video necessary for measuring a video transmission delay time, and generates a video signal. The video distribution unit 12 distributes the video signal generated by the video synthesis unit 11 to the transmission interface 13. At the same time, the video distribution unit 12 notifies the time holding unit 16 of the timing at which the video signal corresponding to the specific video is distributed as a transmission timing. The transmission interface 13 converts the video signal distributed by the video distribution unit 12 into a signal for communication, and transmits the signal toward the monitor 32 via the communication network 20.

The reception interface 14 extracts a reaction signal of the controller 33 from a signal for communication received via the communication network 20. The operation signal reception unit 15 reads the reaction signal from the reception interface 14 and recognizes that the button of the controller has been operated. At the same time, the operation signal reception unit 15 notifies the time holding unit 16 of the timing at which the reaction signal is received as a reception timing. The time holding unit 16 holds, as the transmission time t_start, the time at which the video distribution unit 12 notifies the time holding unit 16 of the transmission timing, and holds, as the reception time t_fin, the time at which the operation signal reception unit 15 notifies the time holding unit 16 of the reception timing. The delay estimation unit 17 calculates the video transmission delay time, which is a difference between the reception time t_fin and the transmission time t_start held by the time holding unit 16, as the video display delay time d_video.

The delay time measurement server 10 may perform delay time measurement several times, and may set an average value of differences between the reception time t_fin and the transmission time t_start as the video display delay time d_video. Several times of delay time measurement makes it possible to shorten the reaction delay time d_reaction. In addition, it is possible to reduce measurement errors of the reception time t_fin and the transmission time t_start.

According to the present embodiment, the delay time measurement server can calculate the video display delay time without arranging a special device on the client side.

Embodiment 3

FIGS. 6 to 8 illustrate examples of a specific video used for calculating a video display delay time in the present disclosure. FIG. 6 illustrates an example of a countdown moving image. First, a message "Press the button at the timing of "0"" is displayed, and a sequential countdown is performed. A video corresponding to the count zero is a specific video. The timing at which the video distribution unit 12 distributes a video signal obtained by encoding the specific video to the transmission interface 13 is a transmission timing. In FIG. 6, the countdown is started from "10", but the numerical value from which the countdown is started is not limited to this numerical value. In addition, the countdown ends at "0", but the numerical value at which the countdown ends is not limited to this numerical value.

In the case of a countdown moving image, a user on the client side can expect the timing at which the user operates the button of the controller 33, and thus the reaction delay time d_reaction can be shortened.

FIG. 7 illustrates an example of a moving image in which a symbol moves. First, a message "Press the button when the symbol (in FIG. 7, the symbol of a star mark) arrives here" is displayed, and the symbol of the star mark sequentially approaches the o mark. A video when the symbol of the star mark moves to a predetermined position, that is, the position of the symbol of the o mark is a specific video. The timing at which the video distribution unit 12 distributes a video signal obtained by encoding the specific video to the transmission interface 13 is a transmission timing. In FIG. 7, the moving symbol is the star mark, and the predetermined position is the o mark, but the moving symbol and the predetermined position are not limited thereto.

In the case of a moving image in which a symbol moves, a user on the client side can expect the timing at which the user operates the button of the controller 33, and thus the reaction delay time d_reaction can be shortened.

FIG. 8 is an example of a moving image in which an object moves at a constant speed. First, a message "Press the button when the clock hand faces 12 o'clock" is displayed, and the clock hand sequentially rotates. A video when the clock hand comes to a predetermined position, that is, the 12 o'clock position is a specific video. The timing at which the video distribution unit 12 distributes a video signal obtained by encoding the specific video to the transmission interface 13 is a transmission timing. In FIG. 8, the object moving at a constant speed is the rotating clock hand, and the predetermined position is the 12 o'clock position of the clock, but the object moving at a constant speed and the predetermined position are not limited thereto.

In the case of a moving image in which an object moves at a constant speed, a user on the client side can expect the timing at which the user operates the button of the controller 33, and thus the reaction delay time d_reaction can be shortened.

According to the present embodiment, the delay time measurement server can accurately calculate the video display delay time using a specific video.

As described above, according to the present disclosure, it is possible to calculate a video display delay time without arranging a special device on the client side.

The delay time measurement server of the present disclosure can also be implemented by a computer and a program, and the program can be recorded in a recording medium or provided through a communication network.

INDUSTRIAL APPLICABILITY

The present disclosure can be applied to the communication industry.

REFERENCE SIGNS LIST

10 Delay time measurement server
11 Video synthesis unit
12 Video distribution unit
13 Transmission interface
14 Reception interface
15 Operation signal reception unit
16 Time holding unit
17 Delay estimation unit
20 Communication network
31 Computer
32 Monitor
33 Controller
51 LED
52 Video camera
53 Communication network
54 Monitor
60 Delay time measurement server
71 Computer
72 Monitor

The invention claimed is:

1. A delay time measurement server comprising one or more processors configured to execute instructions that cause the delay time measurement server to perform operations comprising:

encoding a specific video and generating the video signal;

distributing the video signal generated and making a notification of a timing at which the video signal corresponding to the specific video is distributed as a transmission timing;

transmitting, at a transmission interface, the distributed video signal to a monitor via a communication network;

receiving, at a reception interface, a received signal via the communication network, wherein the received signal is generated in response to performance of a user action at the monitor;

making a notification of a timing at which the received signal is received as a reception timing when the reception interface receives the received signal;

holding a time of making the notification of the transmission timing as a transmission time and holding a time of making the notification of the reception timing as a reception time;

calculating a video transmission delay time, which is a difference between the transmission time and the reception time, from when the video signal obtained by encoding the specific video is transmitted to a monitor until when the received signal is received; and determining the video transmission delay time as a video display delay time from when the video signal is transmitted to the monitor until when the video is displayed on the monitor.

2. The delay time measurement server according to claim 1, wherein the specific video is a video corresponding to count zero in a countdown moving image.

3. The delay time measurement server according to claim 1, wherein the specific video is a video in which a symbol has moved to a predetermined position in a moving image in which the symbol moves.

4. The delay time measurement server according to claim 1, wherein the specific video is a video when an object comes to a predetermined position in a moving image in which the object moves at a constant speed.

5. A delay time measurement method comprising encoding a specific video and generating the video signal;

distributing the video signal generated and making a notification of a timing at which the video signal corresponding to the specific video is distributed as a transmission timing;

transmitting, at a transmission interface, the distributed video signal to a monitor via a communication network;

receiving, at a reception interface, a received signal via the communication network, wherein the received signal is generated in response to performance of a user action at the monitor;

making a notification of a timing at which the received signal is received as a reception timing when the reception interface receives the received signal;

holding a time of making the notification of the transmission timing as a transmission time and holding a time of making the notification of the reception timing as a reception time;

calculating a video transmission delay time, which is a difference between the transmission time and the reception time, from when a video signal obtained by encoding a specific video is transmitted to a monitor until when a reaction signal for the specific video is received; and determining the video transmission delay time as a video display delay time from when the video signal is transmitted to the monitor until when the video is displayed on the monitor.

6. A non-transitory computer-readable medium storing instructions that, when executed, cause one or more processors to perform operations comprising:

encoding a specific video and generating the video signal;

distributing the video signal generated and making a notification of a timing at which the video signal corresponding to the specific video is distributed as a transmission timing;

transmitting, at a transmission interface, the distributed video signal to a monitor via a communication network;

receiving, at a reception interface, a received signal via the communication network, wherein the received signal is generated in response to performance of a user action at the monitor;

making a notification of a timing at which the received signal is received as a reception timing when the reception interface receives the received signal;

holding a time of making the notification of the transmission timing as a transmission time and holding a time of making the notification of the reception timing as a reception time;

calculating a video transmission delay time, which is a difference between the transmission time and the reception time, from when a video signal obtained by encoding a specific video is transmitted to a monitor until when a reaction signal for the specific video is received; and determining the video transmission delay time as a video display delay time from when the video signal is transmitted to the monitor until when the video is displayed on the monitor.

\* \* \* \* \*